L. E. PARSONS.
CORN HARVESTER.
APPLICATION FILED SEPT. 22, 1908.

970,945.

Patented Sept. 20, 1910.
6 SHEETS—SHEET 1.

Witnesses

Inventor
L. E. Parsons

L. E. PARSONS.
CORN HARVESTER.
APPLICATION FILED SEPT. 22, 1908.

970,945.

Patented Sept. 20, 1910.
6 SHEETS—SHEET 2.

Witnesses

Inventor
L. E. Parsons
By H. B. Willson & Co
Attorneys

L. E. PARSONS.
CORN HARVESTER.
APPLICATION FILED SEPT. 22, 1908.

970,945.

Patented Sept. 20, 1910.
6 SHEETS—SHEET 4.

Witnesses

Inventor
L. E. Parsons
By H. B. Willson & Co.
Attorneys

L. E. PARSONS.
CORN HARVESTER.
APPLICATION FILED SEPT. 22, 1908.

970,945.

Patented Sept. 20, 1910.
6 SHEETS—SHEET 6.

Witnesses
C. Allen
L. O. Hilton

Inventor
L. E. Parsons
By H. B. Willson & Co.
Attorneys

UNITED STATES PATENT OFFICE.

LEWIS E. PARSONS, OF LEWISTOWN, ILLINOIS.

CORN-HARVESTER.

970,945.   Specification of Letters Patent.   Patented Sept. 20, 1910.

Application filed September 22, 1908. Serial No. 454,183.

*To all whom it may concern:*

Be it known that I, LEWIS E. PARSONS, a citizen of the United States, residing at Lewistown, in the county of Fulton and State of Illinois, have invented certain new and useful Improvements in Corn-Harvesters; and I do declare the following to be a full, clear, and exact description of the invention such as will enable others skilled in the art to which it appertains to make and use the same.

This invention relates to improvements in corn harvesters and has for its object to provide a machine of this character adapted to cut down the corn standing in a field, to pass it upon the platform of the machine, to form it into shocks and to bind the shocks, to twist or bind the wire, and to finally deliver the shocks from the machine upon the ground, all automatically, and it consists in the several combinations and arrangement of parts substantially as hereinafter set forth in the claims.

With this and other objects in view, the invention consists of certain novel features of construction, combination and arrangement of parts as will be more fully described and particularly pointed out in the appended claims.

Figure 1:
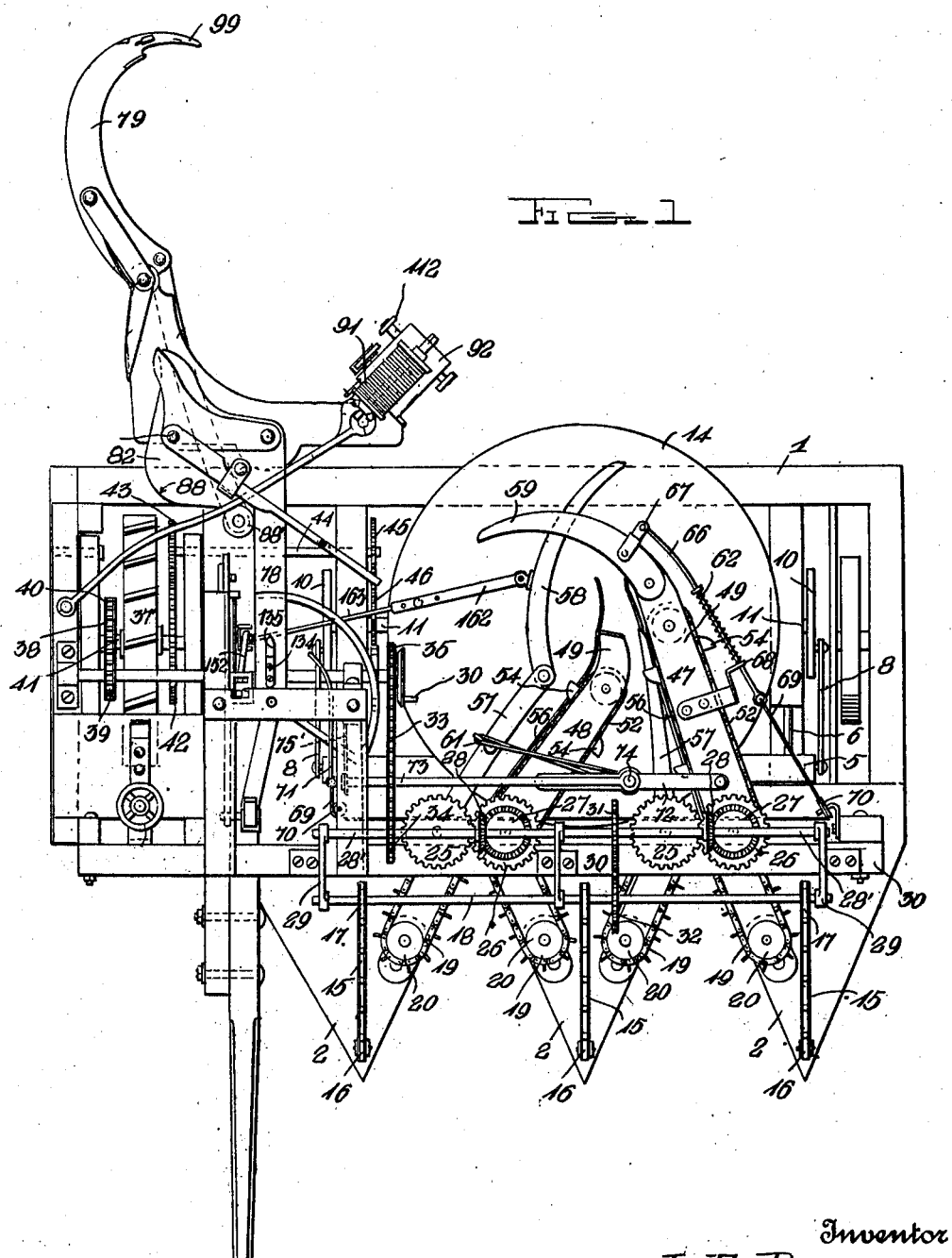
Figure 2:
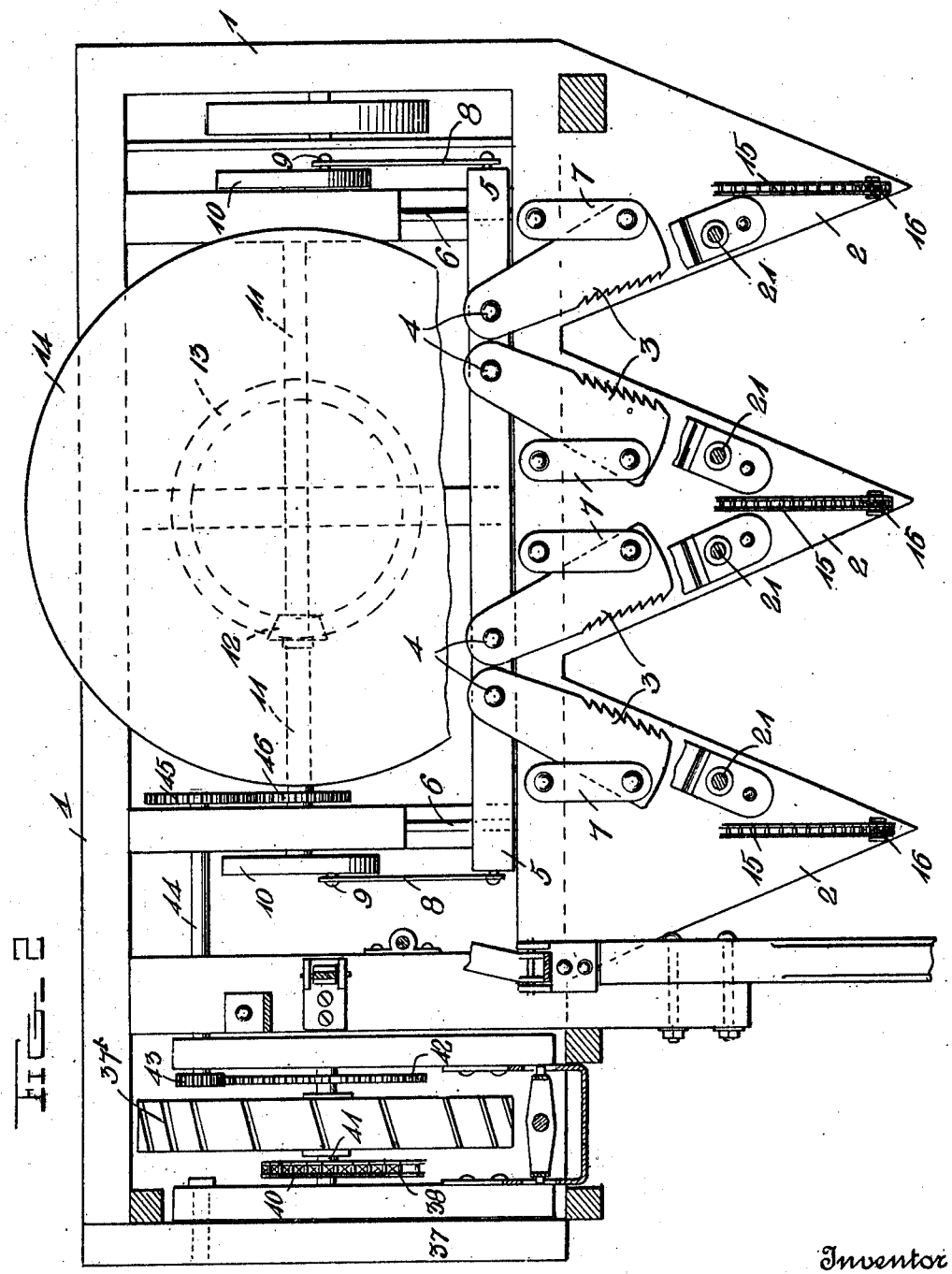
Figure 3:
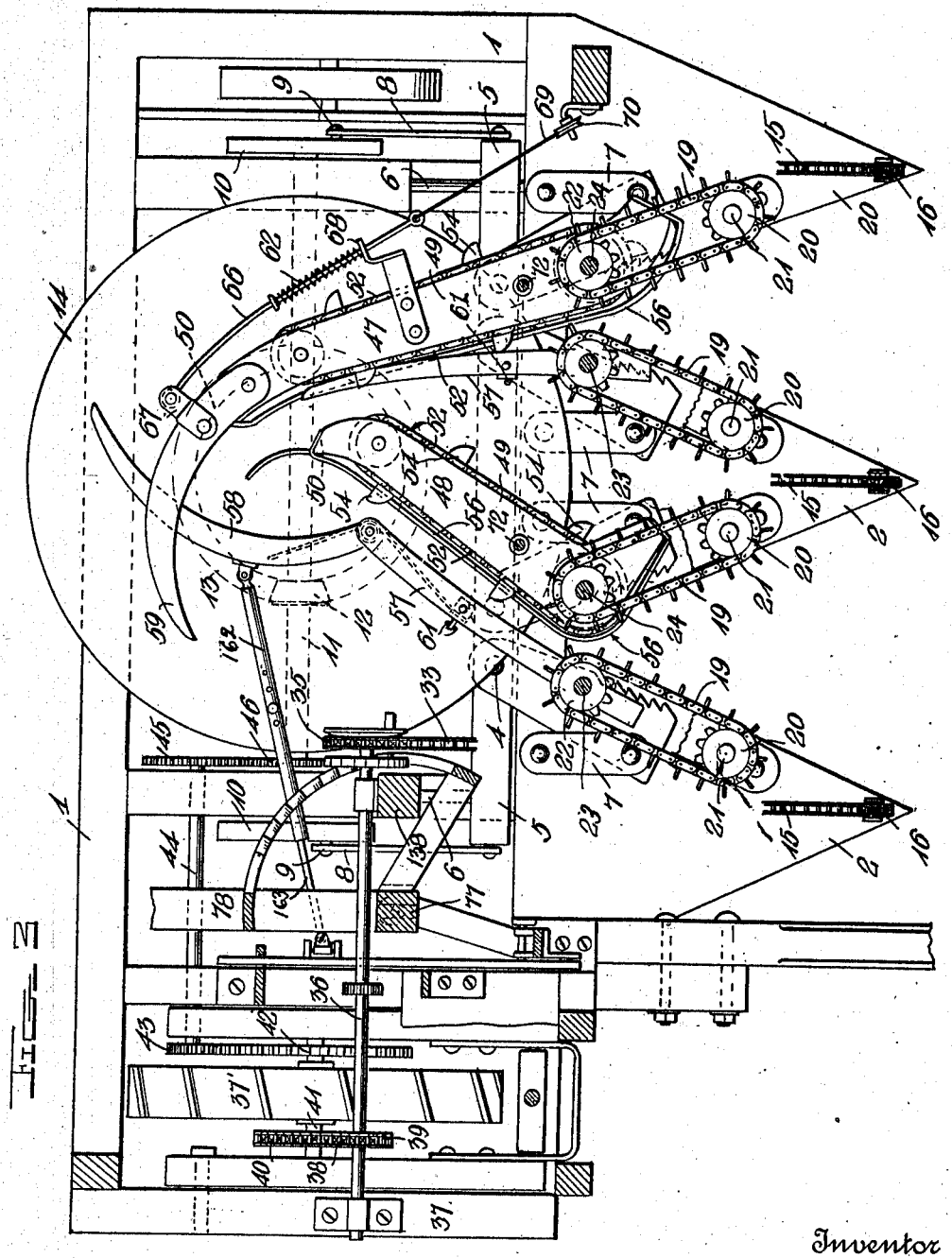
Figure 4:
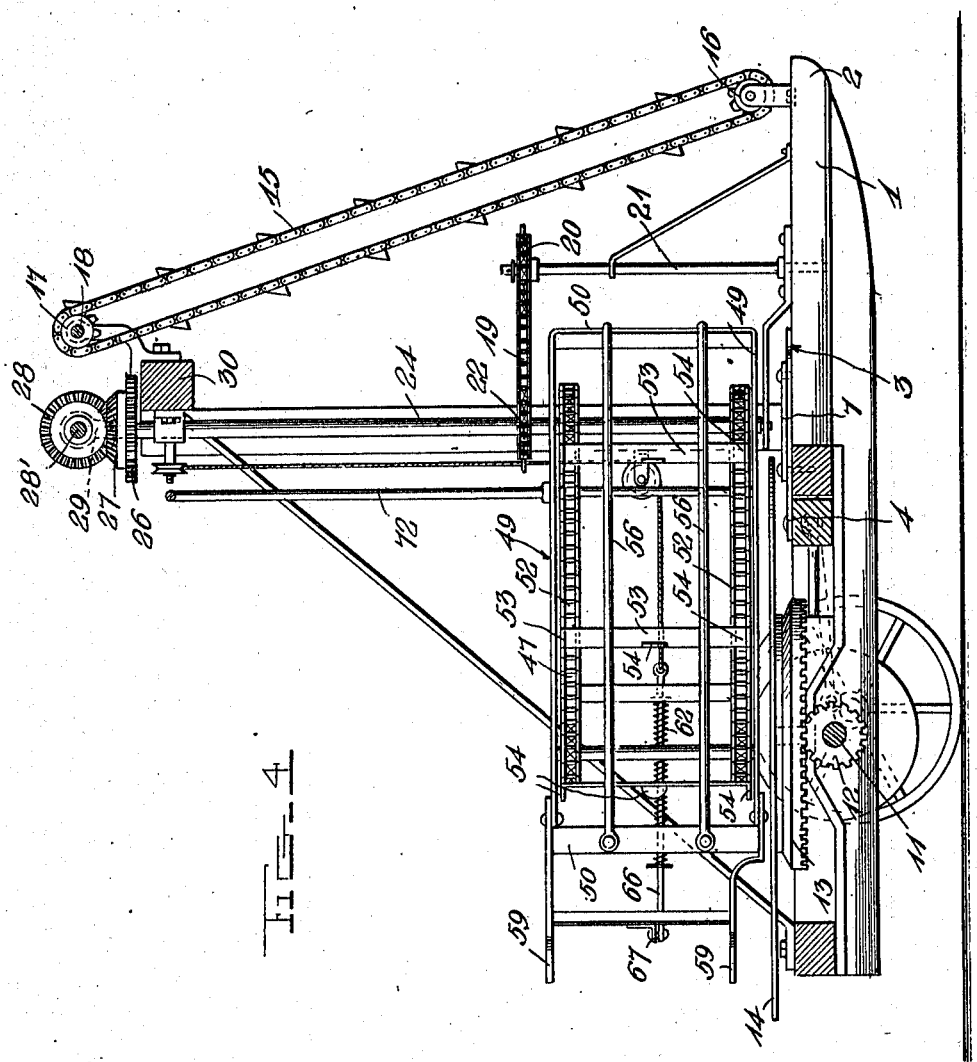
Figure 5:
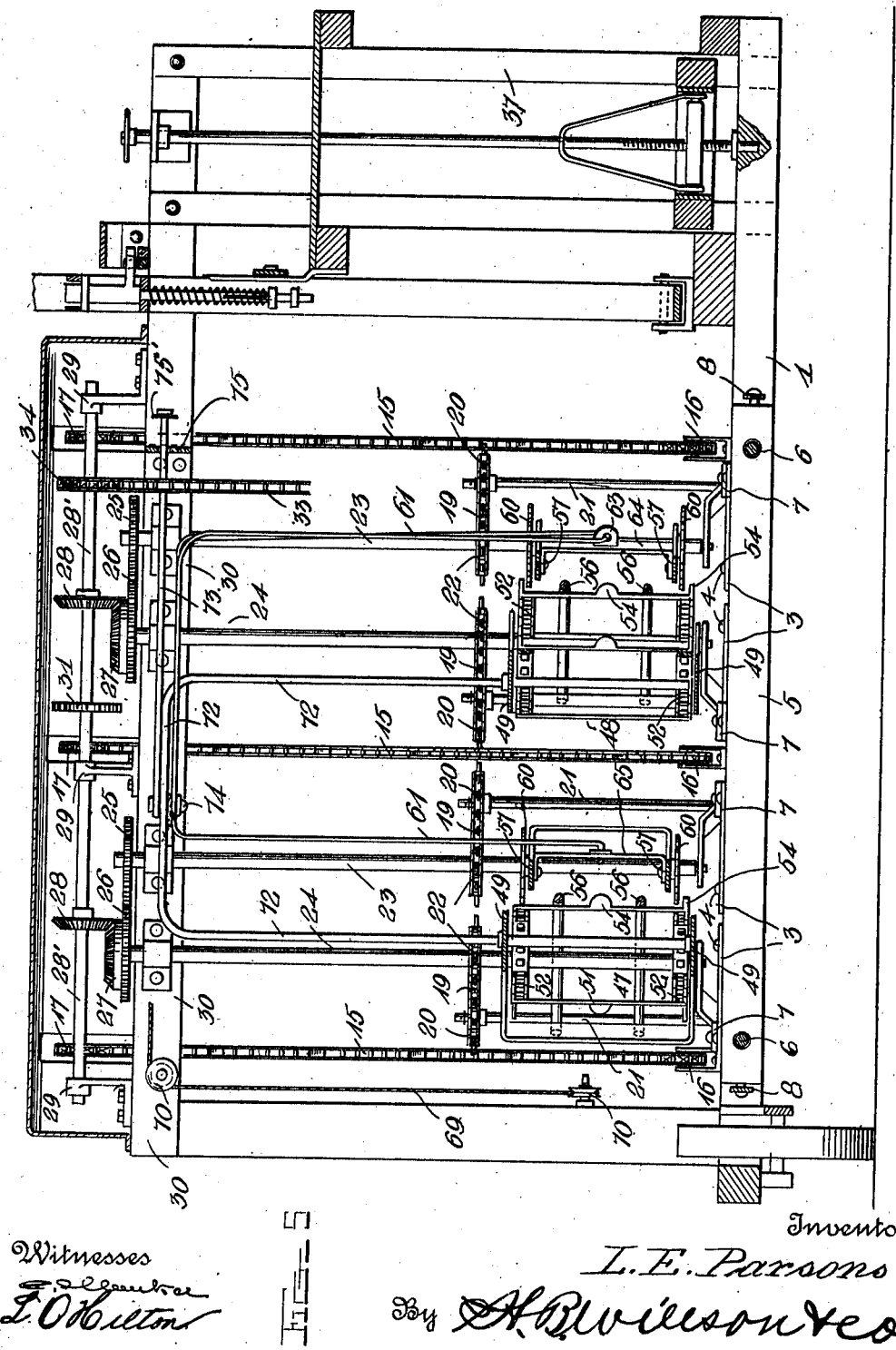
Figure 6:
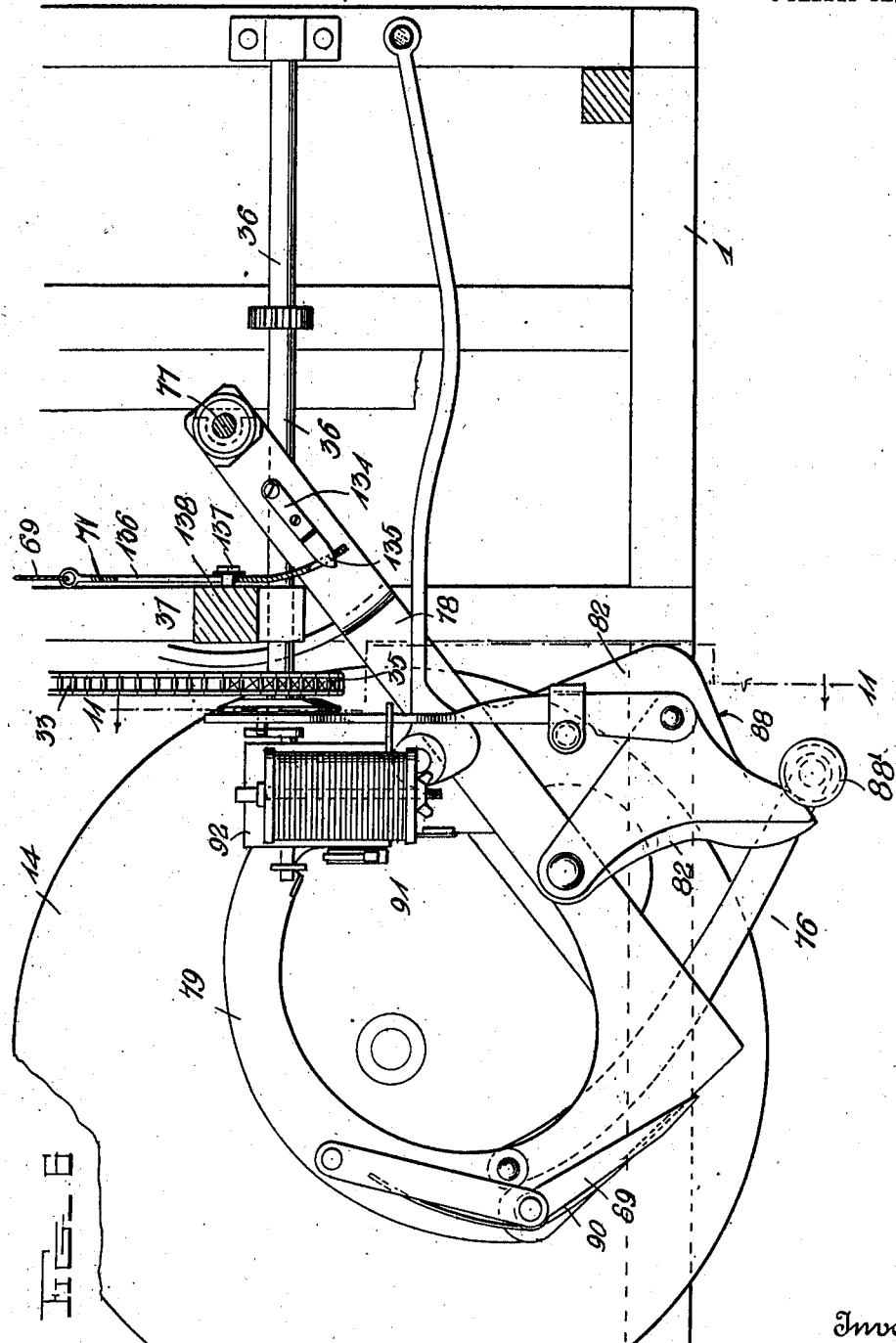

In the accompanying drawings, Figure 1 is a plan view of a machine embodying my improvements, the shock forming mechanism in discharging position; Fig. 2 is a horizontal section taken immediately above the cutting mechanism; Fig. 3 is a similar view taken above the packers; Fig. 4 is a vertical longitudinal section taken through the machine illustrating more particularly the construction of the packers and the corn feeding mechanism; Fig. 5 is a vertical transverse section taken through the packers looking forward; and Fig. 6 is a plan view on an enlarged scale, partly in section, disclosing more particularly the shock binding mechanism.

In the embodiment illustrated, numeral 1 indicates the main supporting frame of the machine provided at its forward edge with a series of approximately triangular shaped guards 2. Two coöperating pair of toothed cutting blades or cutters 3 are pivotally mounted to swing toward and from each other over the spaces left between the inner ends of the guards 2, the members of each pair of cutting blades being pivoted near each other, as at 4, to a reciprocating transverse drive bar 5 mounted to slide upon suitable guide rods 6 extending between the guards and the base of the machine frame. The front end of each cutting blade is connected to the upper face of one of the guards by a link 7. The drive bar 5 is connected at its ends by pitmen 8 with eccentrics 9 carried by suitable wheels 10 mounted upon opposite ends of a transverse shaft 11 mounted in the base of the machine frame. This shaft is shown as provided intermediately of its ends with a suitable pinion 12 which intermeshes with a circular rack 13 carrying a revolving disk platform 14 which receives the corn cut by the toothed cutting blades or cutters 3 and aids, as will be presently understood, by mechanism hereinafter described, to pack the corn stalks in forming the shocks or bundles.

A series of three or more endless chain belts 15 are arranged in advance of the cutting mechanism to lift and pass the fallen corn to the knives, said belts or lifters passing over sprocket wheels 16 suitably mounted at the forward ends of the guards 2 and upwardly over sprocket wheels 17 carried by a transverse shaft 18 mounted at the upper end of the machine frame. Two pair of horizontally disposed endless carriers 19 are also mounted a suitable distance above the cutting mechanism and in parallel relation with the side edges of the guards 2 to assist in feeding the standing corn to the cutting mechanism, said carriers running over sprocket wheels 20 at the upper ends of upright supports 21, suitably mounted upon the guards 2 and also over sprocket wheels 22 fixed to vertical shafts 23 and 24 suitably mounted at the forward end of the machine frame.

The upper ends of the shafts 23 are provided with suitable gear wheels 25 which intermesh with gear wheels 26 at the upper ends of the shafts 24, the gear wheels 26 being provided with bevel pinions 27 which intermesh with pinions 28 on a transverse shaft 28' mounted in suitable bearings 29 bolted or otherwise secured to the upper cross bar 30 of the machine frame. The shaft 28' is also provided with a gear 31 which intermeshes with a suitable pinion 32 fixed to the shaft 18 whereby motion is imparted to the latter and to the lifters 15. The shaft 28' is driven by a sprocket chain 33 which runs over a sprocket wheel 34 at one end of said shaft 28' and over a second sprocket wheel 35 arranged at the inner end of a transverse shaft 36 mounted in an annex frame 37 mounted upon the main supporting frame. The shaft 36 is driven from the master wheel 37' by a sprocket chain 38 which passes over a sprocket wheel 39 at the outer end of said shaft and over a second sprocket wheel 40 fixed to a shaft 41 which carries the master wheel. The shaft 11 is driven by the following means. A gear 42 is fixed to the shaft 41 and intermeshes with a pinion 43 at the outer end of a transverse shaft 44 suitably mounted in the rear of the shaft 11, said shaft 44 being provided at its inner end with a gear 45 which intermeshes with a second gear 46 fixed to the outer end of the shaft 11. Packers 47 and 48 are arranged above the revolving disk platform 14 with their forward ends arranged at the inner ends of the guards 2. Each of these packers consists of upper and lower approximately S-shaped longitudinal pieces 49, the front and rear ends of which are connected by vertical pieces 50 and of endless carriers 52 mounted between the S-shaped pieces of the packers, said carriers being formed or provided with transverse slats 53 and with toothed pieces 54 to engage and carry to the rear, the stalks of corn cut by the knives 3. These packers are also each provided with a series of longitudinally disposed rods or guards 56 which are fastened at their front and rear ends to the end pieces 50 of the packers, said guards serving to prevent the stalks becoming entangled with the belts or carriers while the corn is being packed.

The shocker consists of sets of arms 57 pivoted at their forward ends upon the vertical shafts 23, one set of arms being pivoted at their rear ends to curved or hook-shaped shocking arms 58 adapted to cooperate with correspondingly shaped arms 59 pivoted to the rear ends of the upper and lower pieces of one of the packers. Toothed wheels 60 are fixed to the shafts 23 to assist the carrying of the cut stalks of corn in between the packers and the set of arms 57.

The shocking arms 58 and 59 are normally held so as to cross each other and to provide for the reception, readily between them, of the cut stalks of corn as they pass rearwardly, said arms being adapted to yield outwardly or laterally as said corn accumulates and to hold the corn in compressed form and thus produce a shock. These arms are aided by the action of springs 61 and 62.

The spring 61 is preferably a stout right-angled wire with the looped end engaged with a projection 63 on a cross bar 64 of one set of the arms 57, the opposite end of said spring being engaged or attached to a cross bar 65 of the other set of arms 57. This spring may be also intermediately secured to certain other parts as hereinafter described. The spring 62 is coiled or disposed around a rod 66 pivoted to a projection 67 on one of the curved shocking arms, said rod passing forwardly from said shocking arms through a projection 68 on one of the packers.

To the free end of the rod 66 is connected a cord or other flexible element 69 passing over pulleys 70 mounted at suitable points along the machine frame, and finally connected to a slide bar 71 which will be further referred to. An approximately U-shaped yoke or frame 72 is arranged with its vertical portions extending through the packers near their pivoted points, a bar or arm 73 being fastened to the cross piece of said yoke or arm, as at 74, and extending through a guide bar 75, the free end of said bar being connected to a flat metallic spring 75' attached to the annex frame which serves through the medium of said frame and yoke and said bar to hold the packers convergently toward their rear ends. For this reason, the incoming corn is pressed between the packers and the frame-like arms 57 and the better engaged and carried to the shocking arms by the toothed belts of the packers. A binder and dropper 76 is supported, crane-like, in the annex frame The binder and dropper is mounted to swing inwardly and outwardly at the proper periods during the operation of the machine and comprises an upright shaft 77, having a horizontally extending arm 78 carrying the flat spring 134, provided with an outer beveled edge 135 adapted to engage the outer slotted end of the slide bar 71, just about the time the binder and dropper has reached its closed position, whereby it will be seen that upon the outward or rearward movement of the binder and dropper, the line or cord 69 will be drawn upon and aid in the throwing out of the more distant packer with its shocking arms from the shock about to be taken by the binder and dropper. The slide bar 71 is adapted to have the requisite sliding movement by reason of a slot 136 therein through which passes a headed stud 137, projecting from the post 138 of the machine frame. When the shocking arms are filled to their maximum holding capacity, the tripping mechanism of the binder and dropper is actuated when the binder and dropper begins to swing inwardly to receive the shock. The tripping mechanism 152 of the binder and dropper is adjustably connected with the shocking arms 58 by the tubular extension 162 which is connected with said shocking arms and the connecting rod 163, which is connected with the tripping mechanism and with said tubular extension. When the binder and dropper reaches a position about midway of its two extreme positions, or a point contiguous to the shock, the needle 99 carried by the needle arm 79 which has been moved inwardly by the friction rollers 88' engaging the cam shoulders 88 of the cam plates 82, enters the housing 92 of the twisting or tying device 91, to receive one end of the wire. The needle is then withdrawn from the housing and the wire passed around the shock. The twisting device is next set into operation and the needle caused to reënter the housing, carrying with it the free end of the wire, which is released from the needle and twisted upon the end of the wire held by the twisting device. After the tying operation, the wire is cut by the knife 112. The binder is then swung into its outer or rear position and releases the tied shock, said binder remaining in its outer position until the shocking arms have been again filled to their maximum holding capacity to again operate the trip device of the binder and dropper. For a more detailed description of the construction and operation of the binder and dropper, reference may be had to my divisional applications, filed August 2, 1909, and bearing Serial Numbers 510,891 and 510,892, respectively.

Having thus described and ascertained the nature of my invention, what I claim as new and desire to secure by Letters-Patent is:

1. In a corn harvester, the combination with a rotary platform, and means for operating the same, of packers arranged above said platform and comprising endless slatted, toothed belts at their forward ends, and one having curved pivoted arms at its rear end, frame-like arms paralleling said packers and one having at its rear end curved pivoted arms crossing the aforesaid arms, means for holding the packers convergently toward their rear ends, operating shafts for said belts means for driving said shafts, and cutting mechanism arranged in front of said packers, substantially as set forth.

2. The combination with the packers and the binder and dropper, of shocking arms pivoted to one of the packers, other shocking arms pivoted near and adapted to cross said first mentioned shocking arms, a rod connected to the first mentioned shocking arms, pulleys mounted upon the frame of the machine, a line or cord connected with said rod and passing over said pulleys, a slotted slide bar to which said line is connected said bar having an apertured outer end and an engaging spring carried by the binder and dropper and adapted to engage the apertured end of said slide bar at a certain point during the operation of the machine.

3. In a corn harvester, the combination with a rotary platform and means for rotating the same, of packers arranged above said platform, resilient means for holding the packers convergently toward their rear ends and cutting mechanism arranged in front of said packers.

4. In a corn harvester having a rotary platform and means for operating the same, packers arranged above the platform and comprising endless toothed belts, shocking arms pivoted to the rear end of one of the packers, frame like arms arranged substantially parallel with said packers, other shocking arms pivoted to the rear end of one of said frame like arms and crossing the first mentioned shocking arms, resilient means for holding the packers convergently toward their rear ends and other resilient means to cause the frame like arms to press the grain against the packers as it passes rearwardly.

5. In a corn harvester having a rotary platform and means for operating the same, packers arranged above the platform and comprising endless toothed belts, shocking arms pivoted to the rear ends of one of the packers, frame like arms arranged substantially parallel with said packers, other shocking arms pivoted to the rear end of one of said frame like arms and crossing the first mentioned shocking arms, resilient means for holding the packers convergently toward their rear ends, other resilient means to cause the frame like arms to press the grain against the packers as it passes rearwardly and a spring tending to hold the first mentioned shocking arms against outward movement.

6. In a corn harvester, the combination with the packers and a binder and dropper, of shocking arms pivoted to one of the packers, of the shocking arms pivoted near and adapted to cross said first mentioned shocking arms resilient means tending to hold the first mentioned shocking arms against outward movement, connections to move said first mentioned shocking arms outwardly against the action of such resilient means as the binder and dropper moves outwardly comprising means carried by the binder and dropper for engaging said connections at a certain point during the operation of the machine.

7. In a corn harvester, the combination with the packers and a binder and dropper, of shocking arms pivoted to one of the packers, other shocking arms pivoted near and arranged to cross said first mentioned shocking arms a rod connected with said first mentioned shocking arms, a flexible element connected with said rod, a slotted slide bar to which said flexible element is connected, and means carried by the binder and dropper to engage the slide bar at a certain point during the operation of the machine.

8. In a corn harvester, a pair of packers and resilient means for holding the rear ends of the packers convergently toward each other, said means consisting of an approximately U-shaped yoke having its opposite ends engaged with the packers, a slide bar connected at one end with the central portion of said yoke and a spring connected with the opposite end of said rod.

9. In a corn harvester, a pair of packers, frame like arms arranged substantially parallel with the packers and means for causing said frame like arms to press the corn against the packers as it passes rearwardly, said means consisting of an approximately U-shaped spring having its opposite ends connected with said frame like arms.

10. In a corn harvester, a pair of vertical supports, packers pivoted thereto and comprising toothed endless carriers, other vertical supports arranged near the first mentioned supports, frame like arms pivoted to said last mentioned supports, shocking arms pivoted to one of the packers, other shocking arms pivoted to one of the frame like arms, a series of vertical supports arranged in advance of said first mentioned supports to which the packers and frame like arms are pivoted, sprocket wheels on the supports and carriers passing over said sprocket wheels to feed the corn between the packers and frame like arms.

In testimony whereof I have hereunto set my hand in presence of two subscribing witnesses.

LEWIS E. PARSONS.

Witnesses:
 EDNA W. THOMAS,
 E. EDMONSTON, Jr.